Figure 1:
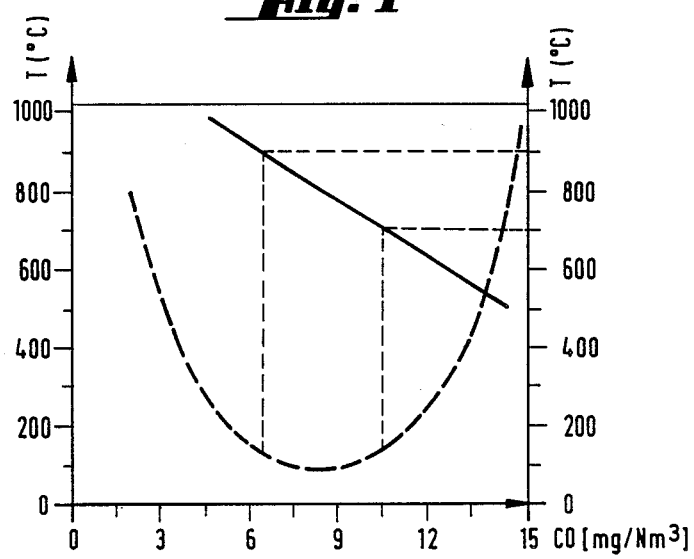

United States Patent [19]

Jormanainen et al.

[11] Patent Number: 4,934,285
[45] Date of Patent: Jun. 19, 1990

[54] METHOD FOR TREATING WASTE MATERIALS

[75] Inventors: Martti J. Jormanainen; Raimo T. Laukkanen, both of Espoo; Herkko Pesonen, Helsinki, all of Finland

[73] Assignee: Outokumpu Oy, Helsinki, Finland

[21] Appl. No.: 356,224

[22] Filed: May 24, 1989

[30] Foreign Application Priority Data

May 25, 1988 [FI] Finland ............................ 882473

[51] Int. Cl.$^5$ .............................................. F23G 5/12
[52] U.S. Cl. ..................................... 110/346; 110/229
[58] Field of Search ............... 110/346, 235, 220, 221, 110/229; 48/209

[56] References Cited

U.S. PATENT DOCUMENTS

| | | | |
|---|---|---|---|
| 4,121,524 | 10/1978 | Voelskow et al. | 110/220 |
| 4,437,419 | 3/1984 | Hertel | 110/346 X |
| 4,665,841 | 5/1987 | Kish | 110/346 X |
| 4,750,437 | 6/1988 | Rouse | 110/346 |

Primary Examiner—Edward G. Favors
Attorney, Agent, or Firm—Dellett, Smith-Hill and Bedell

[57] ABSTRACT

The invention relates to a method for treating waste materials, particularly municipal solid waste materials. In the method the waste material is first pretreated in order to divide the waste material in a compost fraction and a refuse-derived fuel, and then for the compost fraction it is performed a biological waste treatment and for the refuse-derived fuel combustion in a high temperature. According to the method the exhaust gases created in the combustion of the refuse-derived fuel (3) are conducted to an after-burning chamber (13) which burning material it is utilized the gas produced from the biologically decomposed material (2) of the waste material.

7 Claims, 3 Drawing Sheets

METHOD FOR TREATING WASTE MATERIALS

The invention relates to a method for biothermal treatment of waste materials, particularly municipal solid waste materials.

One of the drawbacks of the consumption society is continuously increasing waste amounts and the environmental problems caused by waste materials. In an urban community the quantity of municipal solid waste material which is produced in one year, excluding hazardous waste materials, is about 500 kg per resident and, includes household waste materials and waste materials from shops and offices as well as from other service industries and industry.

If the waste material is not treated, about 1 cubic meter of dumping grounds is needed per resident per year. The problem is, that suitable areas for the dumping grounds are not available. If dumping grounds are placed at a distance from the community that produces the waste material, the cost of transporting costs of waste material increases substantially.

The need for the space of the dumping ground can decisively be decreased by treating the waste material. If the waste material is treated by a biothermal treating method the need for the space of the dumping ground is only 1/10 that needed for untreated waste material.

In the biothermal method waste material is pretreated so that the biologically good-decomposable material, the so called compost fraction, and the material suitable for combustion, the refuse-derived fuel, are separated. In the pretreatment also magnetic metals are removed from the waste material.

It is possible to decompose the compost fraction biologically. For example in the so called Wabio process the raw material is the compost fraction of municipal solid waste material for the compost and the sludge from the sewage disposal works and the final product is humic earth and a considerable amount of biogas. The separate details of this Wabio process are described in the article: Loikala J., Jätteenkäsittely Wabioprosessissa; vaihtoehto perinteiselle kaatopaikkakäsittelylle (The treatment of waste material in the Wabio process; an alternative for a traditional treatment in a dumping ground), Kemia-Kemi 15 (1988) 3, pp. 280–282.

The refuse-derived fuel of the biothermal method is a combustion material which is homogenized in the pretreatment and of which heat content is about 20% higher than that of wooden chips. The refuse-derived fuel can advantageously be burned for example in the combination of a fluidized bed boiler and an after-burning chamber.

In order that the combustion of the municipal solid waste materials should be safe in regard to the environment, on one hand a sufficient low combustion temperature is required so that nitrogen oxides are not simultaneously created when the concentration of carbon monoxide is small, and on the other hand the temperature must be sufficiently high that the organic compounds are fully decomposed. FIG. 1 depicts the ratio of the combustion temperature and the concentration of carbon monoxide according to a Swedish paper; DRAV-project report No. 33, Technology; Economics and Environmental Effects of Solid Waste Treatment; Final Report from the DRAV-project; Swedish Association of Public Cleaning and Solid Waste Management, July 1985. In FIG. 1 the continuous line depicts the change on the combustion temperature as a function of the oxygen content in the combustion gas, and the dotted line depicts the change on the carbon monoxide content in the combustion gases as a function of the combustion temperature. It is seen in FIG. 1 that the combustion temperature for essentially complete combustion is in the range of 700°–900° C. The advantage of the essentially complete combustion is a low carbon monoxide content in the combustion gases which point is efficient to the amount of the polyaromatic hydrocarbons (PAH) and the polychlorated dibenzo-p-dioxines (PCDD) and the dibenzofurans (PCDF) in the combustion gases.

Figure 2:
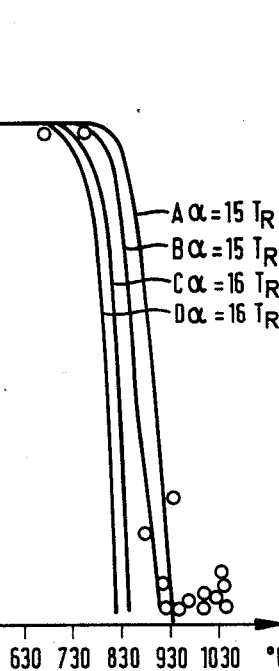
Figure 3:
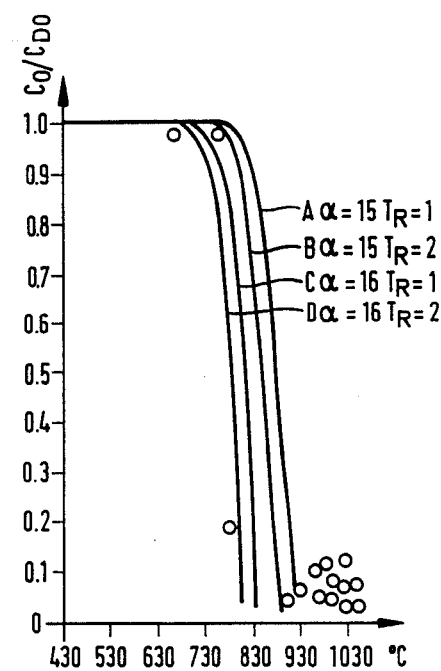

FIGS. 2 and 3 illustrated the measured and the theoretical ratios of dioxin (PCDD) (FIG. 2) and furan (PCDF) (FIG. 3) in the incoming and in the outgoing gases as a function of the combustion temperature determined according to the study described in the article: Cenerini R., Ghezzi U., The dioxin problem in Italian incinerators, Phoenix International 1987, 3, pp. 25–29. The continuous curves A, B, C and D depicted in dioxin FIGS. 2 and 3 describe the theoretical dioxin and furan ratios in the outgoing ($C_O$) and in the incoming ($C_{DO}$) gases at different combustion temperatures, when the delay time of the material $T_R$ in the combustion state varies between 1–2 s and the constant $\alpha$ caused by the turbulence varies between 15–16. The data points depicted in the FIGS. 2 and 3 describe the values measured under the study. It is seen from FIGS. 2 and 3 that when the combustion temperature is over 1100° C. the dioxins and furans in the gases to be treated should also be decomposed according to the calculated values and thus should not cause environmental problems.

The object of the present invention is to achieve an improved and more secure biothermal treating method for waste materials, particularly for municipal solid waste materials, in which refuse-derived fuel is treated in an after-burning chamber with burning material that is produced by biological decomposition of the compost fraction of the waste material. The essential features of the invention are enlisted in the appended claims.

When applying advantageously the invention a biologically waste treatment is carried out on the compost fraction created in the mechanical pretreatment of the waste material and the biogas that is created is recovered and is utilized in the treatment of the refuse-derived fuel created in the mechanical pretreatment of the waste material. The refuse-derived fuel is treated at a high temperature and is fed for example into a fluidized bed boiler in which temperature is between 800°–900° C. Then in the chamber an essentially complete combustion occurs and therefore the carbon monoxide content in the exhaust gases is small. For the same reason the ash created is not fused and is easily removable from the chamber. The combustion gases of the fluidized bed boiler undergo after-burning in the special after-burning chamber where the temperature is maintained between 1000°–1200° C. In order to maintain the temperature and achieve sufficient burning of the combustion gas components that are harmful the environment, at least a part of the biogas created in the biological compost fraction process is fed into the after-burning chamber.

According to invention when using biogas as a burning material in the after-burning chamber of the combustion gases of the refuse-derived fuel, the temperature can be adjusted advantageously for the essentially complete burning and the decomposing of the harmful components, such as the polyaromatic hydrocarbons (PAH) and the polychlorated dibenzo-p-dioxines (PCDD) and the dibenzo-furans (PCDF), which are possible in the municipal solid waste material.

The after-burning chamber used in the method according to the invention is shaped so that it forms an essentially closed system with the fluidized bed boiler used in the treatment of the refuse-derived fuel and that after the connection between the fluidized bed boiler and the after-burning chamber the gas flowing is essentially going downwards. The biogas used as a burning material in the after-burning chamber according to the invention consists 60–65% methane and the balance carbon dioxide and is fed into the after-burning chamber through burners positioned perpendicular to the direction of the gas flow in the after-burning chamber. The highest point at which biogas used as a burning material is fed into the after-burning chamber is advantageously sufficiently low down that the temperature at the connection between the fluidized bed chamber and the after-burning chamber is not increased so that ash will not be fused at the level of the connection between the fluidized bed chamber and the after-burning chamber.

When the gas flow is essentially downwards in the after-burning chamber, the ash that is at least partly fused under the treatment of the combustion gases can be removed from the lower part of the chamber while the gases that are essentially free of the components harmful for the environment can be conducted to a further treatment.

Figure 4:
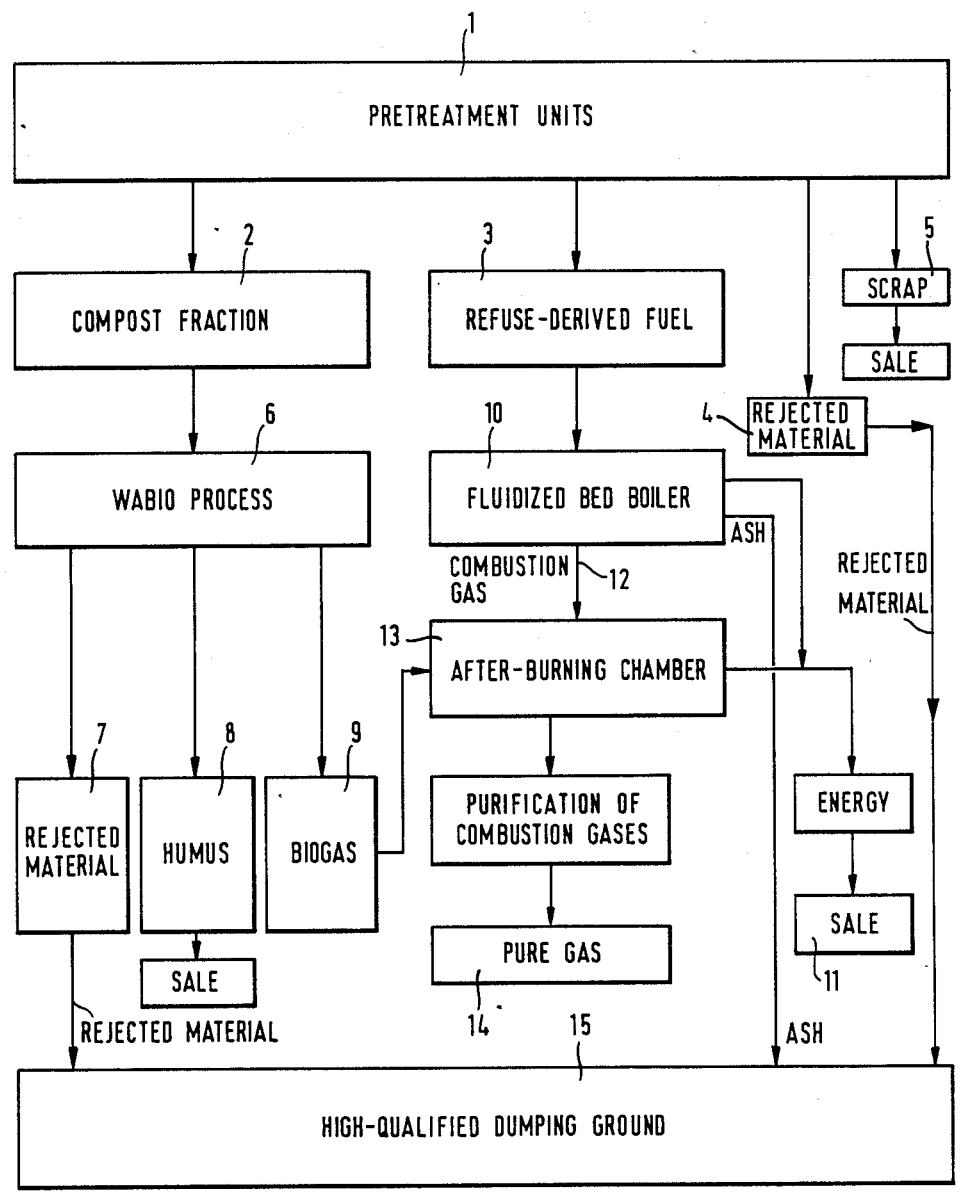

The invention is in the following explained in more details referring to the appended drawings, where FIG. 1 depicts the ratio between the burning temperature and the carbon monoxide content according to the DARV paper, FIG. 2 depicts the measured and theoretical dioxin ratios in the incoming and in the outgoing gases as a function of the combustion temperature, FIG. 3 depicts the measured and theoretical furan ratios in the incoming and in the outgoing gases as a function of the combustion temperature, FIG. 4 depicts one advantageous embodiment of the invention schematically.

Figure 5:
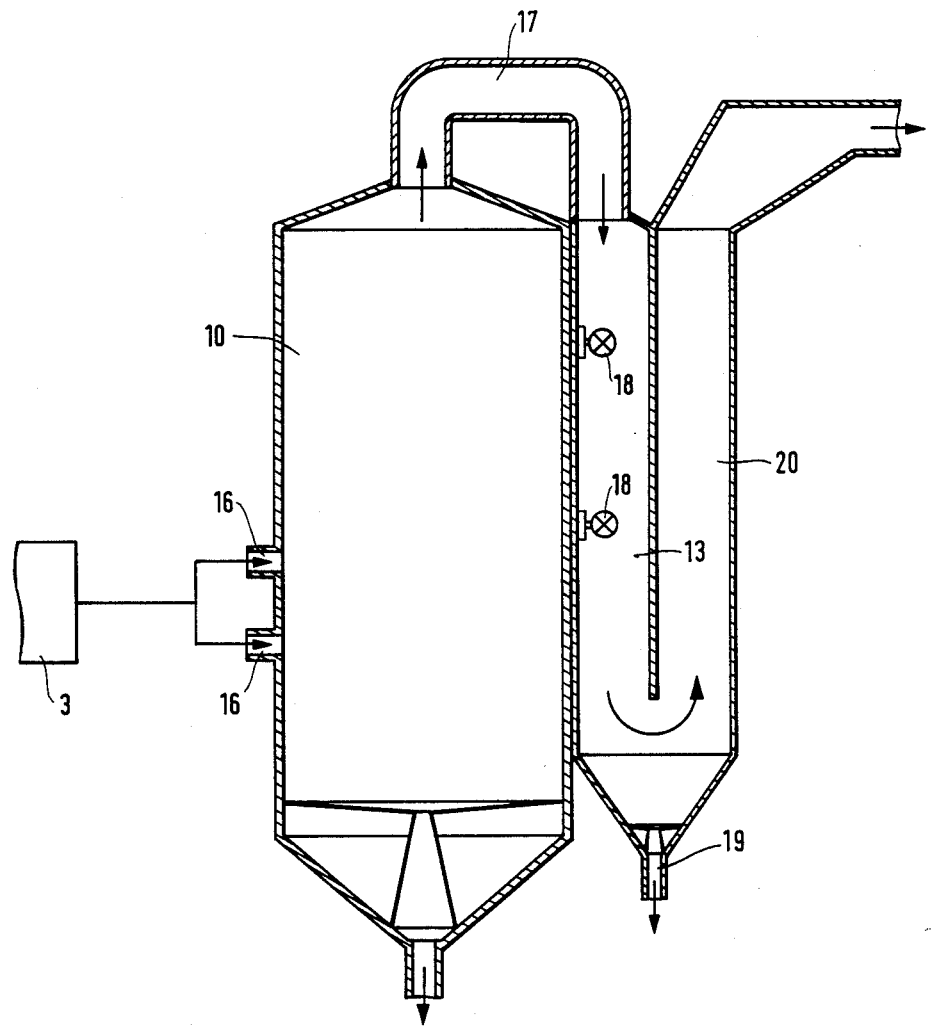

FIG. 5 depicts the combination of the fluidized bed boiler and the after-burning chamber used with the embodiment according to FIG. 4 seen in partial side-view elevation.

The FIGS. 1, 2 and 3 are already described in connection with the prior art.

According to FIG. 4 a mechanical pretreatment 1 is first performed on the municipal solid waste treatment to be treated by the method of the invention. In the pretreatment the waste material is divided into a compost fraction 2, a refuse-derived fuel 3, rejected material 4 and scrap 5 possibly to be sold. The compost fraction 2 undergoes a biological waste treatment 6, which yields rejected material 7 humus 8 which is suitable for sale as well as the biogas 9 utilized in accordance with the invention. The temperature of this biogas is between 30°–60° C., advantageously 35°–50° C.

The refuse-derived fuel is conducted for burning material is the fluidized bed boiler 10 in which the temperature is maintained between 800°–900° C. in order to make possible the essentially complete burning of the refuse-derived fuel. The energy created in the combustion is recovered and is utilized in different ways, among others as a sales product 11.

The combustion gases 12 from the fluidized bed boiler 10 are directly conducted into an after-burning chamber 13. In the after-burning chamber 13, the biogas 9 created in the biological waste treatment 6 of the compost fraction is utilized as a burning material. The amount of the biogas fed into the after-burning chamber is advantageously about 50% of the amount of the biogas produced, and the temperature in the after-burning chamber 13 is maintained advantageously between 1000°–1200° C. Ash in the combustion gases is fused at least partly and is removed from the gases. For the combustion gases of the after-burning chamber 13 a further treatment 14 is performed in order to create pure gas.

According to the FIG. 4 when using the method in accordance with invention only rejected material 4, 7 and the ashes from the fluidized bed boiler 10 and from the after-burning chamber 13 have to be transported to a dumping ground 15.

In accordance with FIG. 5, refuse-derived fuel is fed into the fluidized bed boiler 10 through feeding openings 16. The gases created in the fluidized bed boiler 10 are connected from the upper part of the chamber through a connection 17 to the upper part of the after-burning chamber 13. Biogas is fed into the gases flowing downwards in the after-burning chamber 13 through burners 18. It can be one or more burners 18 and they can also be positioned at different heights in the after-burning chamber 13. The ash in the gases of the after-burning chamber 13 and is partly fused and is recovered in the lower part of the after-burning chamber 13 through a discharge opening 19. The purified gases are further conducted for energy recovery in the screen section 20 of the after-burning chamber 13.

We claim:

1. A method for treating waste materials, particularly municipal solid waste materials, comprising:
   (a) dividing the waste material into a compost fraction and a refuse-derived fuel,
   (b) biologically decomposing the compost fraction in a manner such as to generate a gaseous fuel,
   (c) burning the refuse-derived fuel at a high temperature,
   (d) conducting exhaust gases generated from burning the refuse-derived fuel into an after-burning chamber, and
   (e) feeding at least part of the gaseous fuel generated in step (b) into the after-burning chamber and burning it therein.

2. A method according to claim 1, wherein the gaseous fuel produced in step (b) is biogas.

3. A method according to claim 1, wherein the after-burning chamber has an upper part and a lower part and step (e) comprises feeding the gaseous fuel into the upper part of the chamber.

4. A method according to claim 1, wherein the after-burning chamber has a top and a bottom, and between its top and its bottom it has an upper part and a lower part, and step (d) comprises conducting the exhaust gases generated in combustion of the refuse-derived fuel into the after-burning chamber at the top thereof, and step (e) comprises feeding the gaseous fuel into the upper part of the after-burning chamber below its top.

5. A method according to claim 1, comprising feeding about 50% of the quantity of gaseous fuel generated in step (b) into the after-burning chamber in step (e).

6. A method according to claim 1, comprising feeding gaseous fuel into the after-burning chamber at a temperature in the range from about 30°–60° C.

7. A method according to claim 6, when the temperature is in the range of about of about 35°–50° C.

* * * * *